United States Patent [19]

Takeo

[11] Patent Number: 5,091,970
[45] Date of Patent: Feb. 25, 1992

[54] METHOD FOR JUDGING THE PRESENCE OR ABSENCE OF LIMITED IRRADIATION FIELD

[75] Inventor: Hideya Takeo, Kanagawa, Japan

[73] Assignee: Fuji Photo Film Co., Ltd., Kanagawa, Japan

[21] Appl. No.: 560,495

[22] Filed: Jul. 25, 1990

Related U.S. Application Data

[63] Continuation of Ser. No. 330,666, Mar. 30, 1989, abandoned.

[30] Foreign Application Priority Data

Mar. 31, 1988 [JP] Japan .................................. 63-80070
Jul. 26, 1988 [JP] Japan ................................ 63-186086

[51] Int. Cl.⁵ .............................................. G06K 9/00
[52] U.S. Cl. ..................................... 382/48; 250/327.2
[58] Field of Search ...................... 382/48, 22, 18, 30, 382/54, 50; 250/327.2 A, 327.2 D, 484.1 B, 370.09, 370.1

[56] References Cited

U.S. PATENT DOCUMENTS

| | | | |
|---|---|---|---|
| 4,315,318 | 2/1982 | Kato et al. .......................... | 382/54 |
| 4,317,179 | 2/1982 | Kato et al. .......................... | 382/54 |
| 4,765,744 | 8/1988 | Kobayashi .......................... | 382/61 |
| 4,818,876 | 4/1989 | Agano et al. ..................... | 250/327.2 |
| 4,827,526 | 5/1989 | Matsumoto ........................... | 382/1 |
| 4,931,644 | 6/1990 | Adachi et al. ..................... | 250/327.2 |
| 4,952,805 | 8/1990 | Tanaka ............................. | 250/327.2 |

*Primary Examiner*—David K. Moore
*Assistant Examiner*—Yon Jung
*Attorney, Agent, or Firm*—Sughrue, Mion, Zinn, Macpeak & Seas

[57] ABSTRACT

A method for judging the presence or absence of a limited irradiation field comprises the steps of obtaining an image signal by reading out a radiation image of an object from a recording medium on which the radiaton image has been recorded, and calculating first and second representative values on the basis of the image signal. The first representative value is representative of the values of the image signal corresponding to the overall peripheral portion of the recording medium or corresponding to part of the peripheral portion. The second representative value is representative of the values of the image signal corresponding to the overall area of the recording medium or corresponding to approximately the center portion of the recording medium. The first representative value and the second representative value are compared with each other, and the presence or absence of a limited irradiation field is judged on the basis of the results of the comparison.

3 Claims, 5 Drawing Sheets

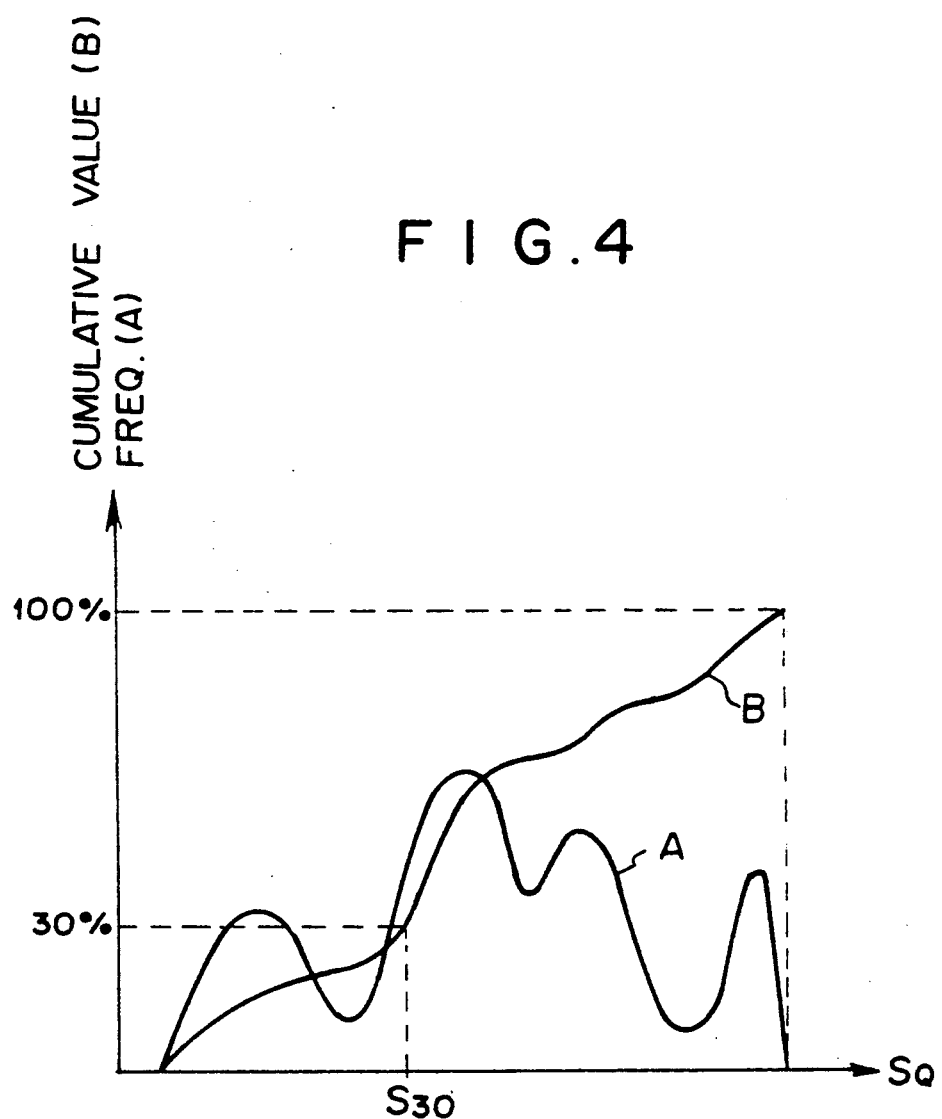

METHOD FOR JUDGING THE PRESENCE OR ABSENCE OF LIMITED IRRADIATION FIELD

This is a continuation of application No. 07/330,666 filed Nov. 30, 1989 now abandoned.

BACKGROUND OF THE INVENTION

This invention relates to a method for obtaining an image signal by reading out a radiation image of an object from a recording medium, on which the radiation image has been recorded, and judging based on the image signal whether the irradiation field was limited during the recording of the radiation image.

Techniques for reading out a recorded radiation image in order to obtain an image signal, carrying out appropriate image processing on the image signal, and then reproducing a visible image by use of the processed image signal heretofore have been known in various fields. For example, as disclosed in Japanese Patent Publication No. 61(1986)-5193, an X-ray image is recorded on an X-ray film having a small gamma value designed so as to match the type of image processing to be carried out, the X-ray image is read out from the X-ray film and converted into an electric signal, and the electric signal (image signal) is processed and then used for reproducing the X-ray image as a visible image on a photograph or the like. In this manner, a visible image having good image quality with high contrast, high resolution high graininess, or the like can be reproduced.

Also, when certain kinds of phosphors are exposed to radiation such as X-rays, $\alpha$-rays, $\beta$-rays, $\gamma$-rays, cathode rays, or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and then is scanned with stimulating rays, such as a laser beam, which cause it to emit light in proportion to the amount of energy stored during exposure to the radiation. The light emitted by the stimulable phosphor sheet upon stimulation thereof is detected photoelectrically converted into an electric image signal, and by using the image signal the radiation image of the object is reproduced as a visible image on a recording material such as a photographic film, a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density, regardless of the energy intensity of the radiation to which the stimulable phosphor sheet was exposed, by setting an appropriate read-out gain when detecting the emitted light and converting it into an electric signal to be used in reproduction of a visible image on a recording material or a display device.

In order to detect an image signal accurately, certain factors which affect the image signal must be set in accordance with the dose of radiation delivered to the stimulable phosphor sheet and the like. A novel radiation image recording and reproducing system which accurately detects an image signal has been proposed in, for example, Japanese Unexamined Patent Publication Nos. 58(1983)-67240, 58(1983)-67241 and 58(1983)-67242. The proposed radiation image recording and reproducing system is constituted such that a preliminary read-out operation (hereinafter simply referred to as "preliminary read out") is carried out for approximately ascertaining the radiation image stored on the stimulable phosphor sheet. In the preliminary read out, the stimulable phosphor sheet is scanned with a light beam having a comparatively low energy level, and a preliminary read-out image signal obtained during the preliminary read out is analyzed. Thereafter, a final read-out operation (hereinafter simply referred to as "final read out") is carried out for obtaining the image signal, which is to be used during the reproduction of a visible image. In the final read out, the stimulable phosphor sheet is scanned with a light beam having an energy level higher than the energy level of the light beam used in the preliminary read out, and the radiation image is read out with the factors affecting the image signal adjusted to appropriate values on the basis of the results of an analysis of the preliminary read-out image signal.

The term "read-out condition" as used hereinafter means a group of various factors, which are adjustable and which affect the relationship between the amount of light emitted by the stimulable phosphor sheet during image read out and the output of a read-out means. For example, the term "read-out condition" may refer to a read-out gain and a scale factor which define the relationship between the input to the read-out means and the output therefrom, or the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary read out is or is not carried out, it has also been proposed to analyze the image signal (including the preliminary readout image signal) obtained and to adjust an image processing condition, which is to be used when the image signal is processed, on the basis of the results of an analysis of the image signal. The proposed method is applicable to cases where an image signal is obtained from a radiation image recorded on a recording medium such as conventional X-ray film, as well as to the systems using stimulable phosphor sheets.

Various methods have been proposed for calculating how the read-out condition for final read out and/or the image processing condition should be adjusted on the basis of an analysis of the image signal (including the preliminary read-out image signal). As one of such methods, it has been proposed in, for example, Japanese Patent Application No. 59(1984)-12658 to create a histogram of the image signal. When a histogram of the image signal is created, the characteristics of a radiation image recorded on a recording medium such as a stimulable phosphor sheet or X-ray film can be ascertained based on, for example, the maximum value of the image signal, the minimum value of the image signal, or the value of the image signal at which the histogram is maximum, i.e. the value which occurs most frequently. Therefore, if the read-out condition for the final read out, such as the read-out gain or the scale factor, and/or the image processing condition such as the gradation processing condition or the frequency response processing condition is based on an analysis of the histogram of the image signal, it becomes possible to reproduce a visible image suitable for viewing, particularly for diagnostic purposes.

On the other hand, in the course of radiation image recording, it is often desirable for portions of the object not related to a diagnosis or the like to be prevented from being exposed to radiation. Further, when the object portions not related to a diagnosis or the like are exposed to radiation, the radiation is scattered by such portions to the portion that is related to a diagnosis or the like, and the image quality is affected adversely by the scattered radiation. Therefore, when a radiation image is recorded on the recording medium, an irradiation field stop often is used for limiting the irradiation field to an area smaller than the overall recording region of the recording medium so that radiation is irradiated only to that portion of the object which is to be viewed.

However, in cases where the read-out condition for the final read out and/or the image processing condition is calculated on the basis of the results of an analysis of the image signal in the manner described above and the image signal is detected from a recording medium, on which a radiation image has been recorded by limitation of the irradiation field, the radiation image cannot be ascertained accurately if the image signal is analyzed without the shape and location of the irradiation field being taken into consideration. As a result, an incorrect read-out condition and/or an incorrect image processing condition is set so that a visible radiation image suitable for viewing, particularly for diagnostic purposes, cannot be reproduced.

In order to eliminate the aforesaid problem, the applicant has proposed various methods for recognizing an irradiation field as disclosed in, for example, Japanese Unexamined Patent Publication No. 61(1986)-39039. The proposed methods allow the aforesaid problem to be eliminated by recognizing where the irradiation field lies on the recording medium, and calculating the read-out condition for the final read out and/or the image processing condition on the basis of only an image signal corresponding to the region thus recognized.

In general, in the disclosed methods for recognizing an irradiation field, several points which are considered to be present on a contour of the irradiation field, i.e. several prospective contour points, are detected. Thereafter, the straight lines or curves connecting the prospective contour points are detected, and the region surrounded by the straight lines or curves is recognized as the irradiation field.

A novel method for detecting a prospective contour point has been proposed in, for example, Japanese Unexamined Patent Publication No. 62(1987)-15538. The proposed method comprises the steps of detecting light emitted by the recording medium and thus obtaining an image signal composed of image signal components representing the image information at picture elements on the recording medium, and carrying out differentiation processing of the image signal components representing image information recorded at picture elements located along a single line on the recording medium. A point at which the absolute value of the differentiated value obtained during differentiation processing exceeds a predetermined threshold value is detected as a prospective contour point. In cases where several such points are present, the point nearest to an edge of the recording medium is detected as a prospective contour point.

In cases where the irradiation field first is detected and then the image signal representing the image information recorded in the region inside of the detected irradiation field is analyzed in the manner as that described above, an appropriate read-out condition and/or an appropriate image processing condition is determined.

However, with the conventional techniques, because a substantially long operation time is required to detect the irradiation field, the processing capacity of the system is low. Though various attempts heretofore have been made to shorten the operation time, the operation time cannot be shortened too much in order to detect accurately the irradiation field.

On the other hand, many radiation images are recorded without the irradiation field being limited. However, whether the irradiation field was or was not limited heretofore has been known only after the operation which detects the irradiation field is carried out. Therefore, the operations which detect the irradiation fields heretofore have been carried out for all radiation images regardless of whether the irradiation fields were or were not limited during the radiation image recording.

SUMMARY OF THE INVENTION

The primary object of the present invention is to provide a method for judging the presence or absence of a limited irradiation field which carries out a simple operation in order to judge whether the irradiation field was or was not limited before an operation is carried out in order to detect accurately the irradiation field, so that the operation which detects the irradiation field need not be carried out for a radiation image which was recorded without the irradiation field being limited.

Another object of the present invention is to provide a method for judging the presence or absence of a limited irradiation field which enables the operation time to be shortened and enables the processing capacity of a radiation image recording and reproducing system to be increased.

FIG. 1A is a flow diagram showing the procedures of the method for judging the presence or absence of a limited irradiation field in accordance with the present invention. FIG. 1B is a schematic view showing the regions on a recording medium 6.

With reference to FIGS. 1A and 1B, the present invention provides a method for judging the presence or absence of a limited irradiation field, the method comprising the steps of:

(i) obtaining an image signal by reading out a radiation image of an object from a recording medium, such as a stimulable phosphor sheet or photographic film, on which the radiation image has been recorded (step 1), (ii) based on said image signal, calculating a first representative value which is representative of the values of the image signal corresponding to the overall peripheral portion of said recording medium (for example, a region 7 shown in FIG. 1B) or corresponding to part of said peripheral portion (for example, a region 7' shown in FIG. 1B), and a second representative value which is representative of the values of the image signal corresponding to the overall area of said recording medium (i.e. the area composed of the regions 7 and 8 shown in FIG. 1B) or corresponding to approximately the center portion of said recording medium (for example, the region 8 shown in FIG. 1B) (step 2), (iii) comparing said first representative value and said second representative value with each other (step 3), and (iv) judging the presence or absence of a limited irradiation field on the basis of the results of the comparison.

In preferred embodiments of the method for judging the presence or absence of a limited irradiation field in accordance with the present invention, light which is obtained from the recording medium and which represents the radiation image, recorded in the recording medium is detected photoelectrically and converted into an image signal. The term "light obtained from a recording medium and representing a radiation image" as used herein embraces light emitted by a stimulable phosphor sheet when it is exposed to stimulating rays, and light which has passed through a photographic film or is reflected therefrom.

The second representative value, which is representative of the values of the image signal corresponding to the overall area of the recording medium or approximately the center portion of the recording medium, need not be based necessarily on all image signals which correspond to the overall area of the recording medium or approximately the center portion of the recording medium. The second representative value may vary within the range of values which may be regarded as being representative of the values of the image signal which corresponds to the overall area of the recording medium or approximately the center portion of the recording medium. Specifically, the second representative value may be calculated on the basis of the image signal which corresponds to approximately the overall area of the recording medium or to a region having a predetermined area approximately around the center point of the recording medium.

The first representative value and the second representative value each may be, for example, the mean value of the corresponding image signal, the median value of the corresponding image signal, the value of the formula expressed as (maximum value of the corresponding image signal + minimum value of the corresponding image signal)/2, or the value of the image signal corresponding to a cumulative value determined from a cumulative probability density function (e.g. a function B shown in FIG. 4) which represents cumulative values of frequencies of occurrence of respective values of the corresponding image signal. The first representative value and the second representative value need not be calculated necessarily with the same operating process. For example, both of them need not be mean values necessarily.

FIG. 3A is a schematic view showing an example of the radiation image recorded without the irradiation field being limited. FIGS. 3B, 3C, and 3D are schematic views showing examples of radiation images recorded with the irradiation fields being limited into different shapes. In these examples, a stimulable phosphor sheet 11 is employed as the recording medium. In FIG. 3A, the overall area of the stimulable phosphor sheet 11 corresponds to an irradiation field 9. In FIGS. 3B, 3C, and 3D, irradiation fields 9, 9, 9 are limited into a circular shape, a square shape and a rectangular shape, respectively.

As shown in FIGS. 3B, 3C, and 3D, the irradiation field is limited into various shapes. However, in ordinary cases, the irradiation fields 9, 9, 9 are limited so that they are present approximately in the vicinity of the center points of the stimulable phosphor sheets 11, 11, 11.

Also, in each of FIGS. 3B, 3C, and 3D, the region inside of the irradiation field 9 was exposed to radiation, and the region 10 outside of the irradiation field 9 was not exposed to radiation (or was exposed only to scattered radiation). Therefore, the amount of energy stored on the stimulable phosphor sheet 11 during exposure to radiation is large in the region inside of the irradiation field 9, and is very small in the region 10 outside of the irradiation field 9. Also, in cases where the recording medium is a photographic film, the image density on the photographic film differs markedly between the regions inside and outside of the irradiation field 9.

The method for judging the presence or absence of a limited irradiation field in accordance with the present invention is based on the aforesaid findings. Specifically, in cases where a radiation image was recorded over a limited irradiation field on a recording medium, a calculation is made in order to find a first representative value which is representative of the values of the image signal corresponding to the whole or part of the peripheral portion of the recording medium, which peripheral portion is considered to be a region outside of the irradiation field. Also, a calculation is made in order to find a second representative value which is representative of the values of the image signal corresponding to the overall area of the recording medium or corresponding to approximately the center portion of the recording medium, which center portion is considered to be located in the region inside of the irradiation field. The first representative value and the second representative value then are compared with each other. In this manner, it is possible to judge whether the radiation image was recorded over the limited irradiation field as shown in FIG. 3B, 3C, or 3D or was recorded without the irradiation field being limited as shown in FIG. 3A.

In cases where it is judged that the radiation image was recorded without the irradiation field being limited, operations which accurately detect the irradiation field need not be carried out. Therefore, the operation time can be shortened, and the processing capacity of a radiation image recording and reproducing system can be increased.

As shown in FIG. 3D, part of the peripheral portion of the stimulable phosphor sheet 11 is often included in the irradiation field 9. However, the shapes of the limited irradiation fields used in a single radiation image recording and reproducing system are limited to several types. Therefore, it is possible to determine in advance for each radiation image recording and reproducing system what suitable image signal ranges are to be used for the calculation of the first representative value and the second representative value (for example, whether the first representative value is to be calculated from the image signal corresponding to the overall peripheral portion of the recording medium or from the image signal corresponding to part of the peripheral portion) and what type of representative value is to be calculated (for example, whether the mean value is to be calculated or the median value is to be calculated).

BRIEF DESCRIPTION OF THE DRAWINGS

FIG. 4 is a graph showing examples of the probability density function and the cumulative probability density function of an image signal.

DESCRIPTION OF THE PREFERRED EMBODIMENTS

The present invention hereinbelow will be described in further detail with reference to the accompanying drawings.

Figure 1A:
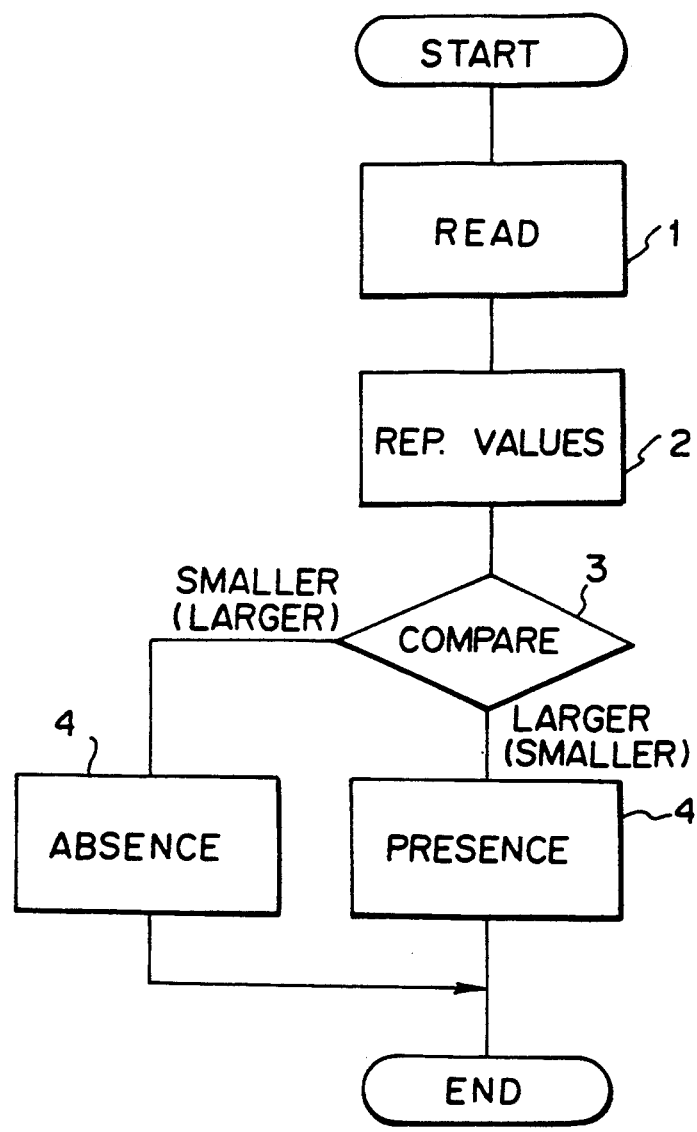
FIG. 1A is a flow diagram showing the procedures of the method for judging the presence or absence of a limited irradiation field in accordance with the present invention.
Figure 1B:
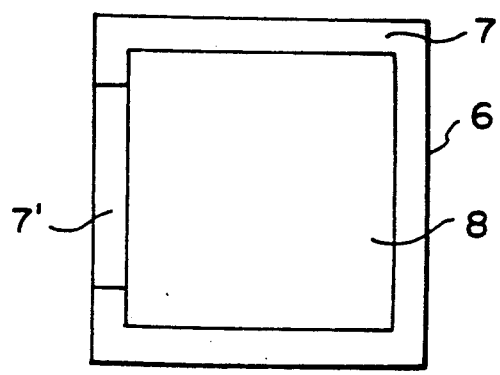
FIG. 1B is a schematic view showing the regions on a recording medium.
Figure 2:
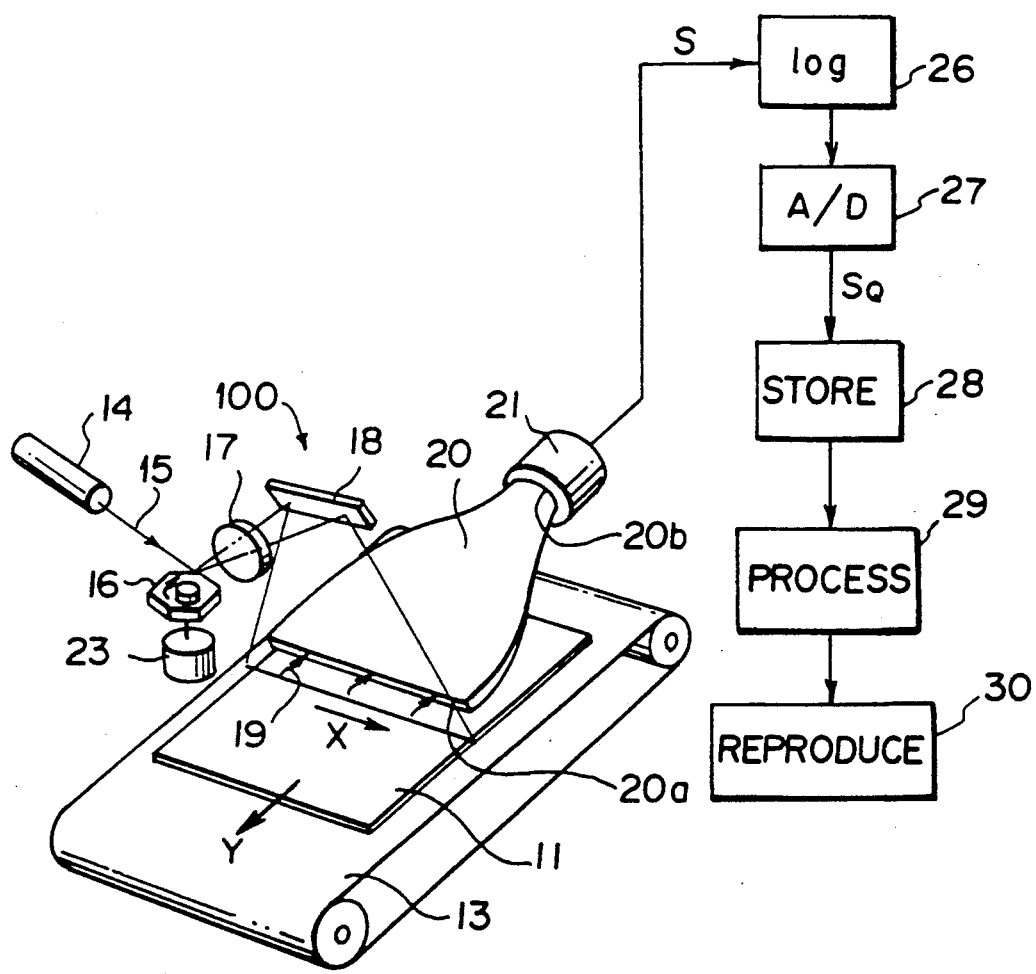
FIG. 2 is a perspective view showing an example of the radiation image read-out and reproducing apparatus wherein an embodiment of the method for judging the presence or absence of a limited irradiation field in accordance with the present invention is employed.

With reference to FIG. 2, a radiation image read-out and reproducing apparatus, wherein an embodiment of the method for judging the presence or absence of a limited irradiation field in accordance with the present invention is employed, utilizes a stimulable phosphor sheet.

A stimulable phosphor sheet 11 on which a radiation image has been stored is placed at a predetermined position in a read-out means 100. The stimulable phosphor sheet 11 is conveyed in a sub scanning direction indicated by the arrow Y by a sheet conveyance means 13 which is constituted of an endless belt or the like and which is operated by an operating means (not shown). On the other hand, a laser beam 15 produced by a laser beam source 14 is reflected and deflected by a rotating polygon mirror 16 which is being rotated quickly by a motor 23 in the direction indicated by the arrow, and caused to pass through a converging lens 17 constituted of an $f\theta$ lens or the like. The direction of the optical path of the laser beam 15 then is changed by a mirror 18, and the laser beam 15 is caused to impinge upon the stimulable phosphor sheet 11 and scan it in a main scanning direction indicated by the arrow X, the main scanning direction being approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during exposure to radiation. The emitted light 19 is guided by a light guide member 20, and photoelectrically detected by a photomultiplier 21. The light guide member 20 is made by the forming of a light guiding material such as an acrylic plate, and has a linear light input face 20a positioned to extend along the main scanning line on the stimulable phosphor sheet 11. The light guide member 20 also has a ring-shaped light output face 20b positioned so that it is in close contact with a light receiving face of the photomultiplier 21. The emitted light 19 which has entered the light guide member 20 from its light input face 20a is guided through repeated total reflection inside of the light guide member 20, emanates from the light output face 20b, and is received by the photomultiplier 21. In this manner, the amount of the emitted light 19 carrying the radiation image is converted into an electric signal by the photomultiplier 21.

An analog output signal S generated by the photomultiplier 21 is amplified logarithmically by a logarithmic amplifier 26, and digitized by an A/D converter 27 into an image signal SQ. The image signal SQ thus obtained is stored in a storage means 28, and then read therefrom by an image processing means 29.

The image processing means 29 first judges whether the radiation image stored on the stimulable phosphor sheet 11 was recorded with or without the irradiation field being limited. In cases where the radiation image is judged to be recorded with the irradiation field being limited, the image processing means 29 makes calculations which accurately detect a contour of the irradiation field. After judging whether the irradiation field was or was not limited during the image recording and detecting the contour of the irradiation field when the irradiation field was limited, the image processing means 29 carries out appropriate image processing on the image signal SQ corresponding to the region inside of the irradiation field.

After being processed, the image signal SQ is fed into a reproduction means 30 which reproduces a visible image from the image signal SQ.

How the image processing means 29 judges, based on the image signal SQ, whether the irradiation field was or was not limited during the image recording will be described hereinbelow.

Figure 3A:
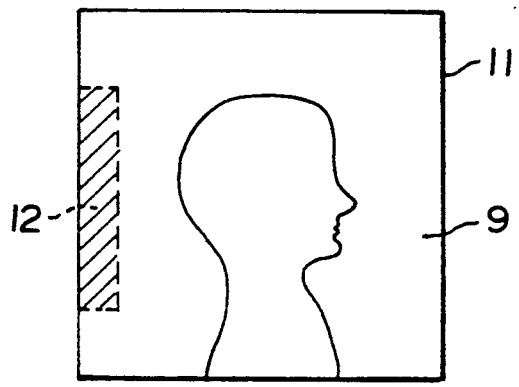
FIG. 3A is a schematic view showing an example of the radiation image recorded without the irradiation field being limited.
Figure 3B:
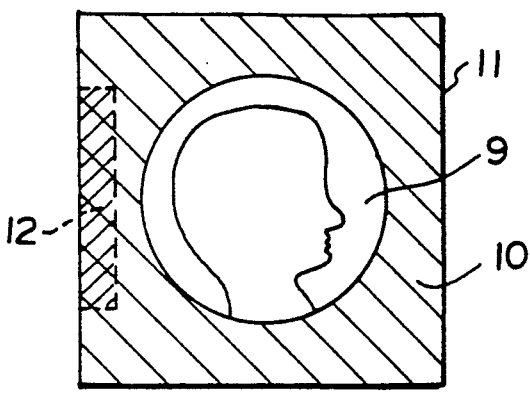
FIGS. 3B, 3C, and 3D are schematic views showing examples of radiation images recorded with the irradiation fields being limited into different shapes.
Figure 3C:
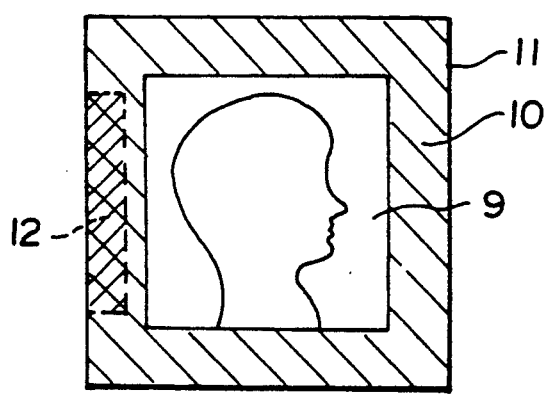
Figure 3D:
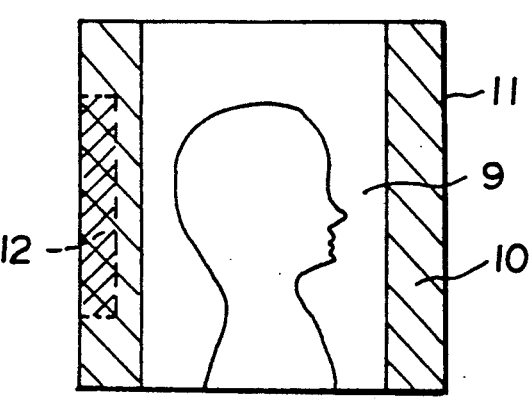

As described above, FIG. 3A shows a radiation image recorded without the irradiation field being limited. FIGS. 3B, 3C, and 3D show radiation images recorded with the irradiation fields being limited into different shapes. In the radiation image read-out and reproducing system of FIG. 2, irradiation fields are limited into three shapes, i.e. the circular shape, the square shape, and the rectangular shape shown in FIGS. 3B, 3C, and 3D.

A first representative value which is representative of the values of the image signal corresponding to a region 12 surrounded by the broken line in FIG. 3A, 3B, 3C, or 3D is calculated from the image signal corresponding to the region 12. As the first representative value, the mean value of the image signal corresponding to the region 12 is employed. Also, a second representative value which is representative of the whole radiation image stored on the stimulable phosphor sheet 11 is calculated from the image signal corresponding to the overall area of the stimulable phosphor sheet 11.

How the second representative value may be calculated will be described hereinbelow with reference to FIG. 4.

FIG. 4 is a graph showing examples of the probability density function (curve A) and the cumulative probability density function (curve B) of the image signal SQ corresponding to the overall area of the stimulable phosphor sheet 11. The horizontal axis represents the values of the image signal SQ. As for the curve A, the vertical axis represents the frequencies of occurrence of the respective values of the image signal. As for the curve B, the vertical axis represents the cumulative value (%) of the frequencies indicated by the curve A.

In order to calculate the second representative value, the cumulative probability density function shown in FIG. 4 is created, and the value S30 of the image signal corresponding to the cumulative value of 30% is found from the cumulative probability density function. The value 30% is taken as the second representative value.

Thereafter, the first representative value and the second representative value thus calculated are compared with each other. As described above, the first representative value is the mean value of the image signal corresponding to the region 12 shown in FIG. 3A, 3B, 3C, or 3D. In the radiation image shown in FIG. 3A, the radiation impinges upon the region 12 directly without passing through the object or without being reflected by the object, and therefore the mean value of the image signal corresponding to the region 12 is large. In the radiation image shown in FIG. 3B, 3C, or 3D, the radiation was prevented by an irradiation field stop from impinging upon the region 12, and therefore the mean value of the image signal corresponding to the region 12 is small. The second representative value approximates the median value between the first representative value in FIG. 3A and the first representative value in FIGS. 3B, 3C, or 3D.

Therefore, when the first representative value is smaller than the second representative value, it is judged that the radiation image was recorded over a limited irradiation field. On the other hand, when the first representative value is larger than the second representative value, it is judged that the radiation image was recorded without the irradiation field being limited.

In cases where it has been judged that the radiation image was recorded over a limited irradiation field, operations which detect a contour of the irradiation field are carried out, and then the image processing condition is calculated on the basis of the image signal corresponding to the irradiation field. In cases where it is judged that the radiation image was recorded without the irradiation field being limited, operations which detect a contour of the irradiation field are omitted, and the image processing condition is adjusted on the basis of the image signal corresponding to the overall area of the stimulable phosphor sheet 11.

The method for judging the presence or absence of a limited irradiation field in accordance with the present invention also is applicable when a preliminary read out is carried out in order to obtain a preliminary read-out image signal, an irradiation field is detected on the basis of the preliminary read-out image signal, and the read-out condition for the final read out is adjusted on the basis of the preliminary read-out image signal corresponding to the region inside of the irradiation field.

The present invention is not limited to the aforesaid embodiment wherein a stimulable phosphor sheet is used, but is also applicable to, for example, an X-ray image read-out apparatus wherein conventional X-ray film i used.

Figure 5:
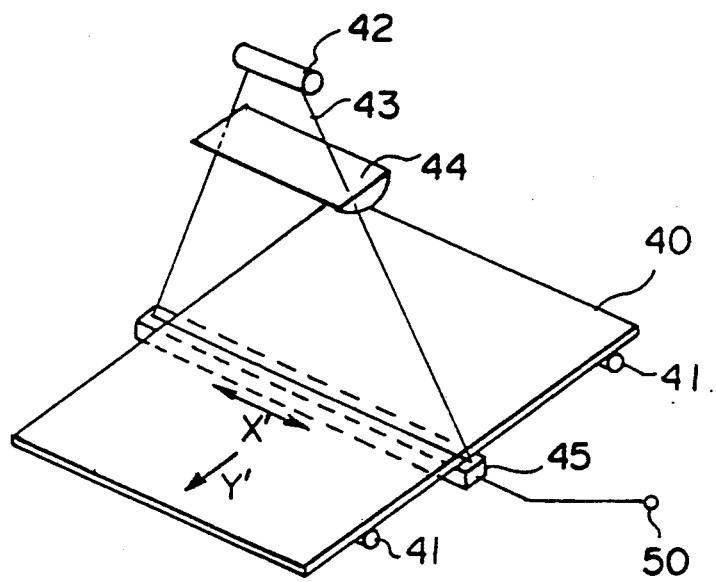
FIG. 5 is a perspective view showing an example of the X-ray image read-out apparatus wherein an X-ray image recorded on an X-ray film is read out.

With reference to FIG. 5, a sheet of X-ray film 40 on which an X-ray image has been recorded is placed at a predetermined position, and is conveyed in the direction indicated by the arrow Y' by a film conveyance means 41.

Reading light 43 produced by an elongated light source 42 extending in one direction, is converged by a cylindrical lens 44, and is irradiated linearly onto the X-ray film 40 along the directions indicated by the arrow X', which are approximately normal to the direction indicated by the arrow Y' A MOS sensor 45 is positioned below the X-ray film 40 so that the MOS sensor 45 can receive the reading light 43 which has passed through the X-ray film 40, the intensity of the reading light having been modulated in accordance with the X-ray image recorded on the X-ray film 40. The MOS sensor 45 comprises a plurality of solid state photoelectric conversion devices which are arrayed linearly at intervals equal to the intervals between the picture elements of the X-ray image along directions indicated by the arrow X'. As long as the X-ray film 40 is conveyed in the direction indicated by the arrow Y' while being exposed to the reading light 43, the MOS sensor 45 detects the reading light, which has passed through the X-ray film 40, at predetermined intervals corresponding to the intervals between the picture elements of the X-ray image along the direction indicated by the arrow Y'.

Figure 6:
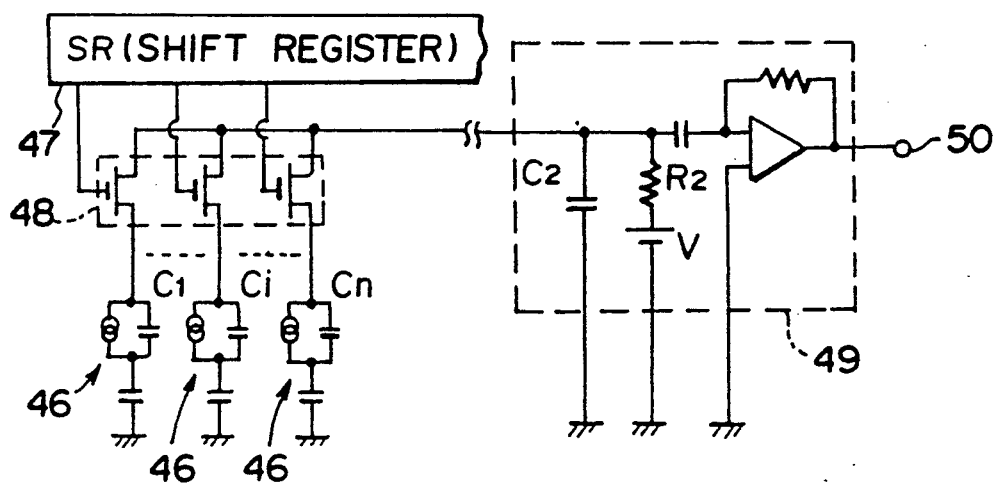
FIG. 6 is a circuit diagram showing an equivalent circuit for a MOS sensor.

FIG. 6 shows an equivalent circuit for the MOS sensor 45.

With reference to FIG. 6, photocarriers generated when the reading light 43 impinges upon the solid state photoelectric conversion devices 46, 46, ... accumulate in capacitors Ci ($i = 1, 2, \ldots, n$) of the solid state photoelectric conversion devices 46, 46, ... The number of photocarriers which accumulate in the capacitors Ci is detected by sequentially turning on and off the switches of a switch section 48. A shift register 47 controls the switches of the switch section 48, and time-serial image signal is obtained. The image signal then is amplified by a pre-amplifier 49, and is output at an output terminal 50 of the pre-amplifier 49.

The analog image signal output by the MOS sensor 45 is sampled and digitized into an image signal. Thereafter, the presence or absence of the X-ray irradiation field is judged based on the digital image signal in the same manner as in the aforesaid embodiment. In the embodiment shown in FIG. 5, the MOS sensor 45 may be replaced by a charge coupled device (CCD) or a charge priming device (CPD). Also, the X-ray image may be read out from the X-ray film 40 by two-dimensionally scanning the X-ray film 40 with a light beam in the same manner as that described above for image read-out from the stimulable phosphor sheet. Furthermore, instead of detecting light which has passed through the X-ray film 40, light reflected by the X-ray film 40 may be detected.

The method for judging the presence or absence of a limited irradiation field in accordance with the present invention is applicable to various types of radiation image read-out and reproducing apparatuses wherein an image signal is obtained by reading out a radiation image of an object from a recording medium, on which the radiation image has been recorded, and wherein a visible image is reproduced from the image signal.

I claim:

1. A method for judging the presence or absence of a limited irradiation field, the method comprising the steps of:
   (i) obtaining an image signal by reading out a radiation image of an object from a recording medium on which the radiation image has been recorded.
   (ii) based on said image signal, calculating a first representative value which is representative of the values of the image signal corresponding to the overall peripheral portion of said recording medium or corresponding to part of said peripheral portion, and a second representative value which is representative of the values of the image signal corresponding to the overall area of said recording medium or corresponding to approximately the center portion of said recording medium,
   (iii) comparing said first representative value and said second representative value with each other,
   (iv) judging the presence or absence of said limited irradiation field on the basis of the results of the comparison,
   (v) discriminating said limited irradiation field if said limited irradiation field is determined to be present in said step (iv), and
   (vi) based on said image signal read out from within said limited irradiation field, determining at least one of image read-out and image processing conditions.

2. A method for judging the presence or absence of a limited irradiation field, the method comprising the steps of:
   obtaining an image signal by reading out a radiation image of an object from a recording medium on which the radiation image has been recorded;
   based on said image signal, calculating a first representative value which is representative of the values of the image signal corresponding to the overall peripheral portion of said recording medium or corresponding to part of said peripheral portion, and a second representative value which is representative of the values of the image signal corresponding to the overall area of said recording medium or corresponding to approximately the center portion of said recording medium;
   comparing said first representative value and said second representative value with each other; and
   judging the presence or absence of said limited irradiation field on the basis of the results of the comparison;
   wherein said second representative value is calculated by operations in which a cumulative probability density function of the image signal corresponding to the overall area of said recording medium is created, and the value of the image signal corresponding to a predetermined cumulative value is determined from said cumulative probability density function and is taken as said second representative value.

3. A method as defined in claim 1 wherein said recording medium is a stimulable phosphor sheet on which a radiation image has been stored, and said image signal is obtained by exposing said stimulable phosphor sheet to stimulating rays which cause it to emit light in proportion to the amount of energy stored during exposure to radiation, and photoelectrically detecting the emitted light.

* * * * *